United States Patent
Sakurada et al.

(10) Patent No.: US 12,404,633 B2
(45) Date of Patent: Sep. 2, 2025

(54) FIBROUS BODY PROCESSING APPARATUS

(71) Applicant: SEIKO EPSON CORPORATION, Tokyo (JP)

(72) Inventors: Jun Sakurada, Nagano (JP); Makoto Sato, Nagano (JP); Koji Motohashi, Nagano (JP); Karen Hasebe, Nagano (JP); Toshihiko Yamazaki, Nagano (JP); Takashi Abe, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 196 days.

(21) Appl. No.: 18/474,299

(22) Filed: Sep. 26, 2023

(65) Prior Publication Data
US 2024/0102240 A1   Mar. 28, 2024

(30) Foreign Application Priority Data
Sep. 28, 2022  (JP) .................. 2022-154646

(51) Int. Cl.
*D21C 1/02*  (2006.01)
*D21B 1/08*  (2006.01)
(Continued)

(52) U.S. Cl.
CPC .................. *D21B 1/08* (2013.01); *D21B 1/32* (2013.01); *D21C 1/02* (2013.01); *D21C 5/02* (2013.01);
(Continued)

(58) Field of Classification Search
CPC .......... D21G 9/0018; D21F 9/00; D21B 1/32; D21B 1/08; D21C 1/02; D21H 11/14
See application file for complete search history.

(56) References Cited

U.S. PATENT DOCUMENTS

| | | | |
|---|---|---|---|
| 12,258,712 B2 * | 3/2025 | Mikoshiba | ........... D21G 9/0018 |
| 2019/0030750 A1 * | 1/2019 | Miyasaka | ................. D21F 9/00 |

(Continued)

FOREIGN PATENT DOCUMENTS

| | | | | |
|---|---|---|---|---|
| CN | 109137625 A | * | 1/2019 | .............. D21F 11/14 |
| JP | 2012-007246 A | | 1/2012 | |

(Continued)

OTHER PUBLICATIONS

English Translation of JP2020157544A,2020. (Year: 2020).*
English Translation of JP2021037642A, 2021. (Year: 2021).*
English translation of CN109137625A, 2019. (Year: 2019).*

*Primary Examiner* — Anthony Calandra
(74) *Attorney, Agent, or Firm* — Global IP Counselors, LLP (57) ABSTRACT

A fibrous body processing apparatus includes a coarsely-crushed-pieces reservoir unit; a humidifying unit that generates humidified air and supplies the humidified air to the coarsely-crushed-pieces reservoir unit; a weight measurement unit that measures a weight of the coarsely crushed pieces let out of the coarsely-crushed-pieces reservoir unit; a fixed amount supplying unit that supplies a fixed amount of the coarsely crushed pieces measured by the weight measurement unit; a defibrating unit that defibrates the coarsely crushed pieces supplied from the fixed amount supplying unit; a first transportation portion through which the coarsely crushed pieces are sent from the coarsely-crushed-pieces reservoir unit to the weight measurement unit; a second transportation portion through which the coarsely crushed pieces are sent from the fixed amount supplying unit to the defibrating unit; and a generated at the humidifying unit is supplied to the defibrating unit while bypassing the weight measurement unit.

6 Claims, 5 Drawing Sheets

(51) Int. Cl.
*D21B 1/32* (2006.01)
*D21C 5/02* (2006.01)
*D21F 9/00* (2006.01)
*D21G 9/00* (2006.01)
*D21H 11/14* (2006.01)

(52) U.S. Cl.
CPC ............ *D21F 9/00* (2013.01); *D21G 9/0018* (2013.01); *D21H 11/14* (2013.01); *Y02W 30/64* (2015.05)

(56) References Cited

U.S. PATENT DOCUMENTS

2019/0263018 A1* 8/2019 Watarai .................. D21B 1/028
2021/0301463 A1* 9/2021 Nakai .................. D21G 9/0018

FOREIGN PATENT DOCUMENTS

| JP | 2020157544 A | * | 10/2020 | ............... B65H 1/20 |
| JP | 2021037642 A | * | 3/2021 | ............... B27N 3/04 |

* cited by examiner

FIBROUS BODY PROCESSING APPARATUS

The present application is based on, and claims priority from JP Application Serial Number 2022-154646, filed Sep. 28, 2022, the disclosure of which is hereby incorporated by reference herein in its entirety.

BACKGROUND

1. Technical Field

Embodiments of the present disclosure relate to a fibrous body processing apparatus.

2. Related Art

A sheet manufacturing apparatus according to related art includes a coarse crusher that coarsely crushes wastepaper, a fixed amount supplying portion that measures the weight of the coarsely crushed pieces obtained at the coarse crusher and supplies a fixed amount thereof, a defibrating unit that defibrates the coarsely crushed pieces supplied thereto, a deposition unit on which a defibrated material obtained at the defibrating unit accumulates in a planar manner, a heating-and-pressing unit that applies heat and pressure to a web formed by the accumulation, a cutting unit that cuts a sheet obtained at the heating-and-pressing unit into a predetermined sheet shape, a sheet collection unit that collects the obtained sheet, and humidifying units that perform humidification at the units.

In a sheet manufacturing apparatus disclosed in Japanese Patent No. 5,509,464, humidified air generated at a humidifying unit passes through a weight measurement unit and a fixed amount supplying unit sequentially and is then supplied to a defibrating unit.

However, in the sheet manufacturing apparatus disclosed in Japanese Patent No. 5,509,464, there is a risk that the wind pressure of humidified air, when passing through the fixed amount supplying unit, might affect accuracy in measuring the weight of coarsely crushed pieces.

SUMMARY

A fibrous body processing apparatus according to a certain aspect of the present disclosure includes a coarsely-crushed-pieces reservoir unit that stores coarsely crushed pieces made of a material that contains fibers; a humidifying unit that generates humidified air and supplies the humidified air to the coarsely-crushed-pieces reservoir unit; a weight measurement unit that measures a weight of the coarsely crushed pieces let out of the coarsely-crushed-pieces reservoir unit; a fixed amount supplying unit that supplies a fixed amount of the coarsely crushed pieces measured by the weight measurement unit; a defibrating unit that defibrates the coarsely crushed pieces supplied from the fixed amount supplying unit; a first transportation portion through which the coarsely crushed pieces are sent from the coarsely-crushed-pieces reservoir unit to the weight measurement unit; a second transportation portion through which the coarsely crushed pieces are sent from the fixed amount supplying unit to the defibrating unit; and a humidified air supplying passage which includes an upstream-side end portion and a downstream-side end portion and through which humidified air generated at the humidifying unit is supplied to the defibrating unit while bypassing the weight measurement unit.

DESCRIPTION OF EMBODIMENTS

Based on some non-limiting preferred embodiments illustrated in the accompanying drawings, a fibrous body processing apparatus according to the present disclosure will now be explained in detail.

First Embodiment

Figure 1:
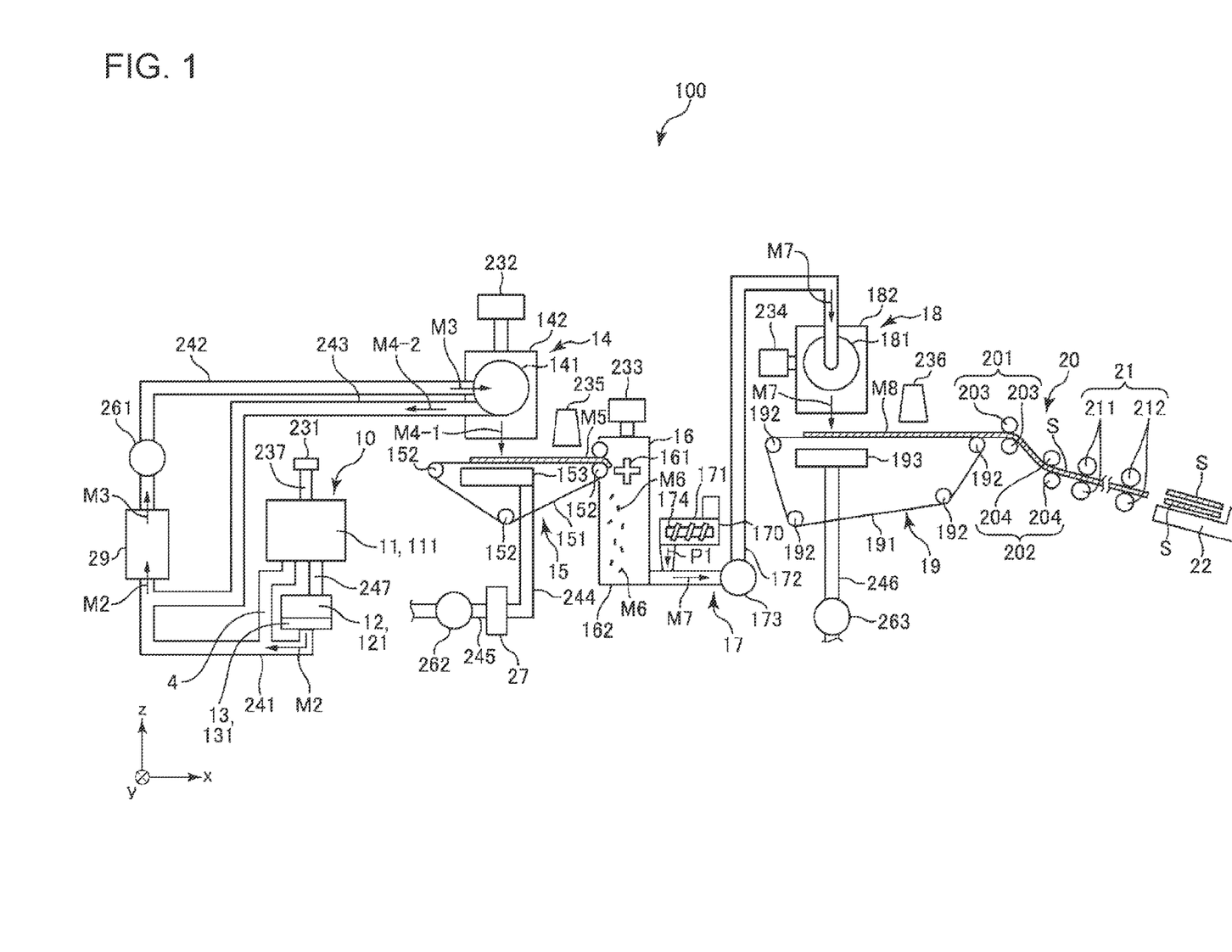
FIG. 1 is a diagram that schematically illustrates the structure of a fibrous body processing apparatus according to a first embodiment of the present disclosure.
Figure 2:
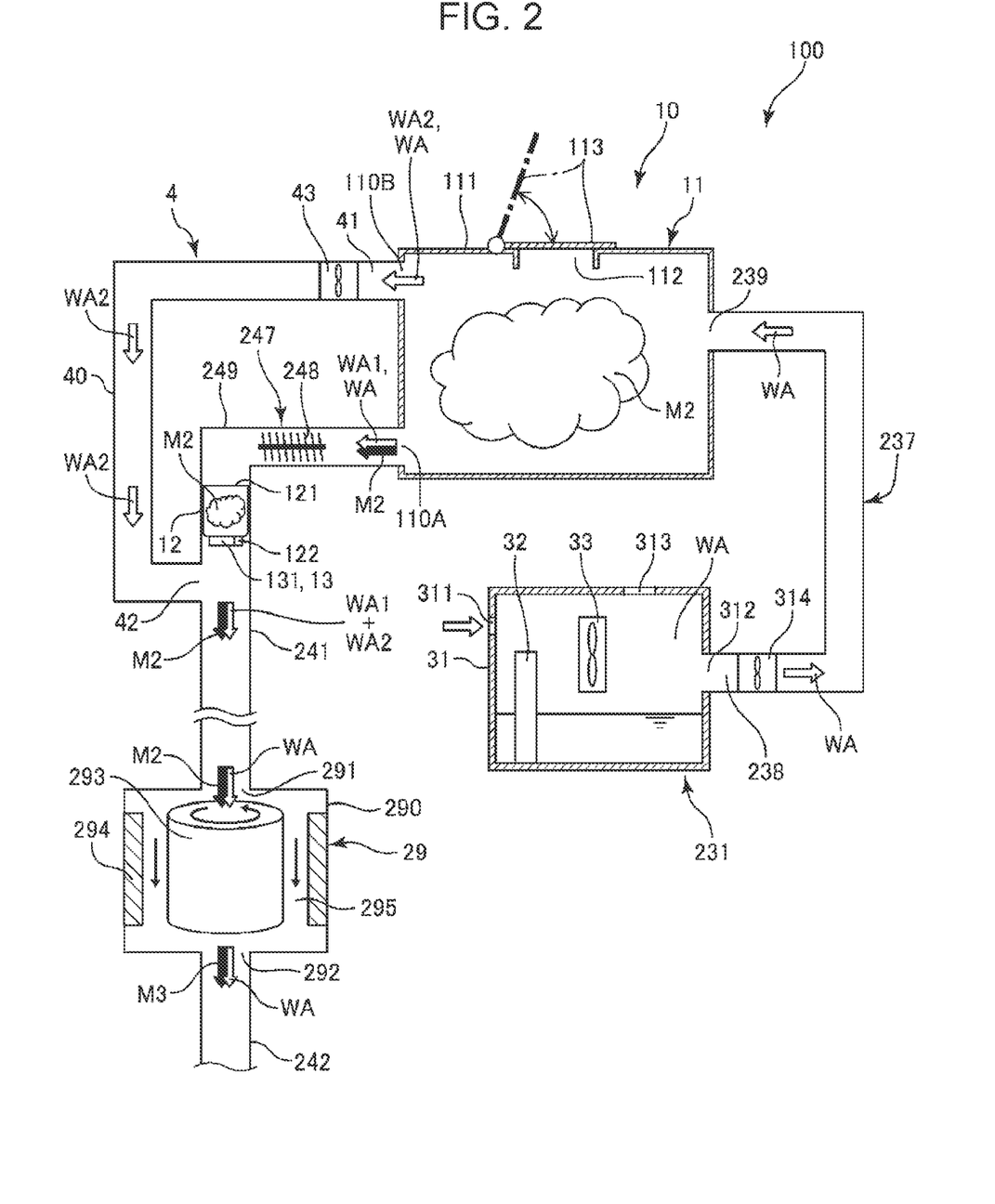
FIG. 2 is a diagram that schematically illustrates the structure of a coarsely-crushed-pieces supplying unit illustrated in FIG. 1, and the neighborhood thereof.
Figure 3:
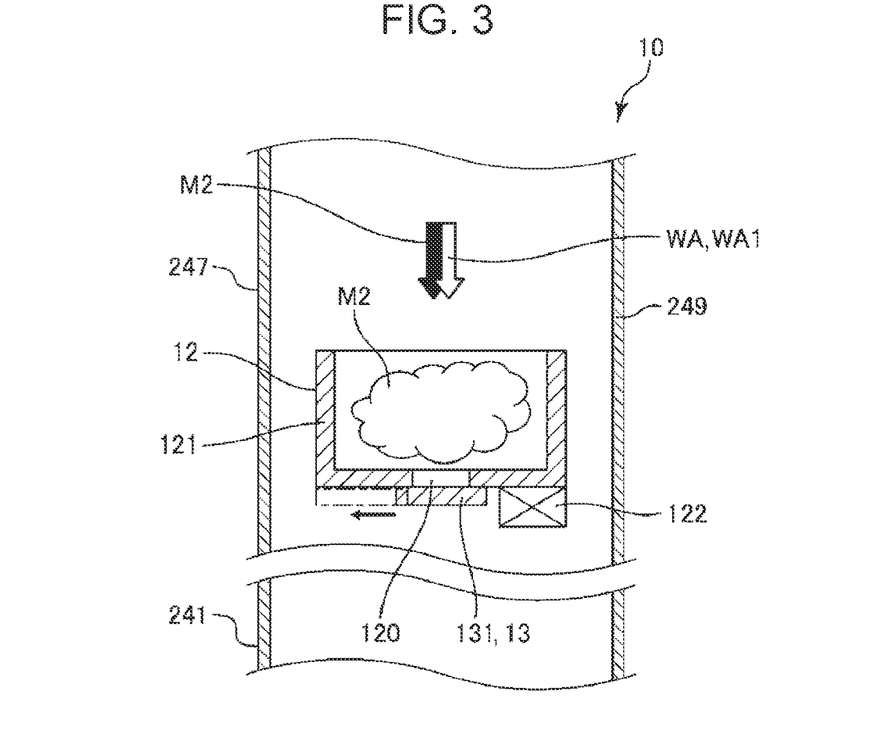
FIG. 3 is an enlarged view of a weight measurement portion and a fixed amount supplying portion illustrated in FIG. 2.
Figure 4:
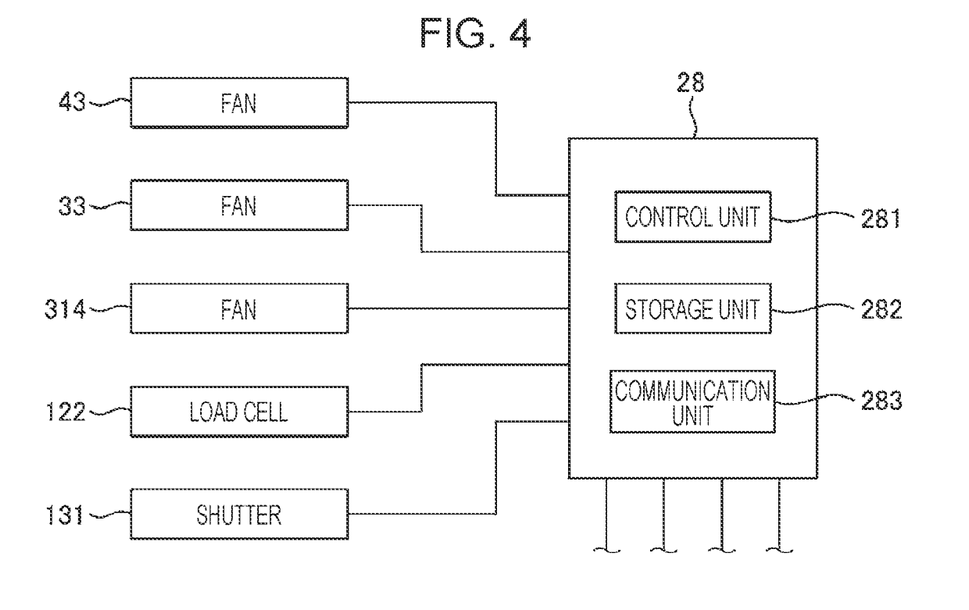
FIG. 4 is a block diagram of the fibrous body processing apparatus illustrated in FIG. 1.

FIG. 1 is a diagram that schematically illustrates the structure of a fibrous body processing apparatus according to a first embodiment of the present disclosure. FIG. 2 is a diagram that schematically illustrates the structure of a coarsely-crushed-pieces supplying unit illustrated in FIG. 1, and the neighborhood thereof. FIG. 3 is an enlarged view of a weight measurement portion and a fixed amount supplying portion illustrated in FIG. 2. FIG. 4 is a block diagram of the fibrous body processing apparatus illustrated in FIG. 1.

In the description below, an upper position in FIG. 1 may be referred to as "above/over" or "upper", and a lower position therein may be referred to as "below/under" or "lower". Since FIG. 1 is a schematic structure diagram, positional relationships between components of a fibrous body processing apparatus 100, orientations thereof, sizes thereof, and the like are not limited to the illustrated example. The direction in which coarsely crushed pieces M2, a defibrated material M3, a first screened material M4-1, a second screened material M4-2, a first web M5, fragments M6, a mixture M7, a second web M8, and recycled paper S are sent, that is, the direction indicated by arrows in FIG. 1, will be referred to also as "transportation direction". The side indicated by the head of the arrows in FIG. 1 will be referred to also as "downstream side" in the transportation direction, and the side indicated by the tail of the arrows in FIG. 1 will be referred to also as "upstream side" in the transportation direction. The same holds true for humidified air WA, WA1, WA2 and coarsely crushed pieces M2 in FIGS. 2, 3, 5, and 6.

The fibrous body processing apparatus 100 illustrated in FIG. 1 produces sheet-shaped recycle paper from coarsely crushed pieces M2 obtained by, for example, shredding wastepaper such as used copy paper. The generation output of the fibrous body processing apparatus 100 is not limited to the recycled paper S; for example, it may be a molded body having a shape like a block.

As illustrated in FIG. 1, the fibrous body processing apparatus 100 includes a coarsely-crushed-pieces supplying unit 10, a defibrating unit 29, a screening unit 14, a first web forming unit 15, a fragmenting unit 16, a mixing unit 17, a dispersing unit 18, a second web forming unit 19, a shape forming unit 20, a cutting unit 21, a stock unit 22, and a collection unit 27.

The fibrous body processing apparatus 100 further includes a humidifying unit 231, a humidifying unit 232, a humidifying unit 233, a humidifying unit 234, a humidifying unit 235, and a humidifying unit 236. In addition to those described above, the fibrous body processing apparatus 100 includes a blower 261, a blower 262, and a blower 263.

In the fibrous body processing apparatus 100, a coarsely-crushed-pieces supplying process, a defibrating process, a screening process, a first web forming process, a fragmenting process, a mixing process, a disentangling process, a second web forming process, a sheet forming process, and a cutting process are performed in this order.

The structure of each unit will now be explained.

The coarsely-crushed-pieces supplying unit 10 is a section that performs a coarsely-crushed-pieces supplying process of supplying the coarsely crushed pieces M2 to the defibrating unit 29, and includes a coarsely-crushed-pieces reservoir portion 11, a coarsely-crushed-pieces sending portion 247, a weight measurement portion 12, and a fixed amount supplying portion 13. The structure of each portion of the coarsely-crushed-pieces supplying unit 10 will be described in detail later. The coarsely crushed pieces M2 are obtained by, for example, coarsely shredding a sheet-like material made of a fiber-containing body containing cellulose fibers. The cellulose fibers may be any fibrous material containing cellulose in the context of a chemical compound (cellulose in a narrow sense) as a chief constituent, and may contain hemicellulose or lignin in addition to cellulose (cellulose in a narrow sense).

It is preferable if the coarsely crushed piece M2 has a shape and a size suited for defibration processing performed at the defibrating unit 29. Examples of the shape of the coarsely crushed piece M2 include a square or a rectangle, in particular, a strip shape, in a plan view. With regard to the size of the coarsely crushed piece M2, it is preferable if the small pieces have an average length of one side of 100 mm or less, or more preferably, 3 mm or more and 70 mm or less. The shape of the small piece may be a shape other than a square or a rectangle. It is preferable if the small piece has a thickness of 0.07 mm or more and 0.10 mm or less.

The humidifying unit 231 is connected to the coarsely-crushed-pieces reservoir portion 11 of the coarsely-crushed-pieces supplying unit 10 via a humidified air sending portion 237, which will be described later. The humidifying unit 231, as illustrated in FIG. 2, humidifies the coarsely crushed pieces M2 contained in the coarsely-crushed-pieces reservoir portion 11. The humidifying unit 231 is a vaporizing humidifying unit that includes a filter 32 containing moisture and produces humidified air WA by letting air pass through the filter 32. Supplying the humidified air WA to the coarsely crushed pieces M2 makes it possible to prevent the electrostatic cling of the coarsely crushed pieces M2 to the inner wall of the coarsely-crushed-pieces reservoir portion 11 and the like.

The humidifying unit 231 is not limited to a vaporizing humidifying unit; for example, it may be an ultrasonic humidifying unit. Similarly, the humidifying unit 232, 233, 234, which will be described later, may be an ultrasonic humidifying unit.

The coarsely-crushed-pieces supplying unit 10 is connected to the defibrating unit 29 through a pipe 241, which is an example of a second transportation portion. The coarsely crushed pieces M2 supplied by the coarsely-crushed-pieces supplying unit 10 are sent to the defibrating unit 29 through the pipe 241.

As illustrated in FIG. 1, the defibrating unit 29 is a section that performs a defibrating process of defibrating the coarsely crushed pieces M2 in air, which means dry defibration. It is possible to produce a defibrated material M3 from the coarsely crushed pieces M2 through the defibrating process performed by the defibrating unit 29. The term "defibration" means the disentanglement of the coarsely crushed pieces M2 made of plural entangled fibers into individual fibers. The result of the disentanglement is the defibrated material M3. The defibrated material M3 has a string shape or a ribbon shape. The defibrated material M3 may be in a state of so-called "lumps", in which defibrated fibers are intertwined with one another in an agglomerated manner.

For example, a turbo mill can be used as the defibrating unit 29. As illustrated in FIG. 2, the turbo mill includes a cylindrical casing 290 that has a coarsely-crushed-pieces inlet 291 and a defibrated material outlet 292, a liner 294 provided on the inner circumferential surface of the casing 290, a rotor 293 that rotates inside the casing 290 without being in contact with the liner 294, and a non-illustrated motor that is a driver for rotation of the rotor 293. The liner 294 has non-illustrated teeth in the circumferential direction. The rotor 293 has a plurality of non-illustrated blades arranged radially.

The motor provided in the defibrating unit 29 and configured to drive and rotate the rotor 293 is electrically coupled to the controller 28 for control of its operation. The rotor 293 is rotated/stopped in response to energization ON/OFF to the motor, thereby performing/stopping defibration processing.

In a state in which the defibrating unit 29 is activated to perform defibration processing, the coarsely crushed pieces M2 having been fed into the casing 290 via the coarsely-crushed-pieces inlet 291 are pulverized and defibrated when passing through a clearance 295 between the rotor 293 that is rotating and the liner 294. By this means, it is possible to let out the defibrated material M3 obtained through the defibration processing via the defibrated material outlet 292 and send it to the screening unit 14 through a pipe 242.

The pipe 242 is connected to the downstream-side port of the defibrating unit 29. The blower 261, which is, for example, a turbo-type fan, is provided on a portion located between the ends of the pipe 242. The blower 261 is an airflow generator that generates airflow toward the screening unit 14. This facilitates taking the coarsely crushed pieces M2 into the defibrating unit 29 and sending the defibrated material M3 out to the screening unit 14. As will be described later, although the defibrating unit 29 has a structure for smooth passing of the coarsely crushed pieces M2, a raw material, and for smooth defibration processing, the operation of the blower 261 provided downstream of the defibrating unit 29 facilitates the passing of the coarsely crushed pieces M2 inside the defibrating unit 29 and the defibration processing. The blower 261 may be provided upstream of the defibrating unit 29.

The screening unit 14 is a section that performs a screening process of screening the defibrated material M3 according to the lengths of fibers. In the screening unit 14, the defibrated material M3 is sorted into a first screened material M4-1 and a second screened material M4-2, which has a greater fiber length than the first screened material M4-1. The first screened material M4-1 has a size suitable for the subsequent production of recycled paper S. The second screened material M4-2 contains, for example, insufficiently defibrated fibers, excessive agglomeration of defibrated fibers, and the like.

The screening unit 14 has a drum portion 141 and a housing portion 142, which houses the drum portion 141.

The drum portion 141 is a sieve that has a cylindrical net structure and rotates around its central axis. The defibrated material M3 flows into the drum portion 141. By rotation of the drum portion 141, the defibrated material M3 that is smaller than the mesh of the net is sorted as the first screened material M4-1, and the defibrated material M3 that is larger than the mesh of the net is sorted as the second screened material M4-2.

The first screened material M4-1 falls from the drum portion 141. On the other hand, the second screened material M4-2 is sent to a pipe 243 connected to the drum portion 141. The pipe 243, at its downstream-side end that is the opposite of an end connected to the drum portion 141, is connected to a portion located between the ends of the pipe 241. The second screened material M4-2 that has flowed through the pipe 243 merges with the coarsely crushed pieces M2 inside the pipe 241 and flows together with the coarsely crushed pieces M2 into the defibrating unit 29. By this means, the second screened material M4-2 is returned to the defibrating unit 29 and is subjected to defibration again together with the coarsely crushed pieces M2.

The first screened material M4-1 dropping from the drum portion 141 falls while being dispersed in air, and travels toward the first web forming unit 15, which is located under the drum portion 141. The first web forming unit 15 is a section that performs a first web forming process of forming a first web M5 from the first screened material M4-1. The first web forming unit 15 includes a mesh belt 151, three stretching rollers 152, and a suction unit 153.

The mesh belt 151 is an endless belt, and the first screened material M4-1 accumulates thereon. The mesh belt 151 is stretched around the three stretching rollers 152. The first screened material M4-1 on the mesh belt 151 is transported downstream by the rotation of the stretching rollers 152.

The first screened material M4-1 has a size larger than the mesh of the mesh belt 151. Therefore, the first screened material M4-1 is unable to pass through the mesh belt 151 and is thus able to accumulate on the mesh belt 151. The first screened material M4-1 is transported downstream together with the mesh belt 151 while accumulating on the mesh belt 151. Therefore, the first web M5 that has a layer shape is formed.

There is a possibility that the first screened material M4-1 contains, for example, dust particles or the like. For example, coarse crushing or defibration sometimes produces dust particles or the like. The dust particles or the like are collected into the collection unit 27 to be described later.

The suction unit 153 is a suction mechanism that sucks air from below the mesh belt 151. By this means, it is possible to suck dust particles or the like that have passed through the mesh belt 151, together with air.

The suction unit 153 is connected to the collection unit 27 via a pipe 244. The dust particles or the like sucked by the suction unit 153 are collected into the collection unit 27.

A pipe 245 is connected to the collection unit 27. A blower 262 is provided on a portion located between the ends of the pipe 245. By the operation of the blower 262, a suction force can be generated in the suction unit 153. This facilitates the forming of the first web M5 on the mesh belt 151. The first web M5 formed in this way does not contain dust particles or the like. The dust particles or the like flow through the pipe 244 to reach the collection unit 27 due to the operation of the blower 262.

The housing portion 142 is connected to the humidifying unit 232. The humidifying unit 232 is a vaporizing humidifying unit. Therefore, humidified air is supplied into the housing portion 142. The humidified air humidifies the first screened material M4-1. This prevents the electrostatic cling of the first screened material M4-1 to the inner wall of the housing portion 142.

The humidifying unit 235 is provided downstream of the screening unit 14. The humidifying unit 235 is an ultrasonic humidifying unit that forms a mist. Ultrasonic misting supplies moisture to the first web M5, thereby adjusting the moisture content of the first web M5. The moisture adjustment prevents the electrostatic cling of the first web M5 to the mesh belt 151. Therefore, the first web M5 comes off easily from the mesh belt 151 at a position where the mesh belt 151 is turned back by the stretching roller 152.

The fragmenting unit 16 is provided downstream of the humidifying unit 235. The fragmenting unit 16 is a section that performs a fragmenting process, in which the first web M5 that has come off from the mesh belt 151 is fragmented. The fragmenting unit 16 includes a propeller 161 that is rotatably supported and a housing portion 162 that houses the propeller 161. It is possible to fragment the first web M5 by rotating the propeller 161. The first web M5 is broken into fragments M6. The fragments M6 fall inside the housing portion 162.

The housing portion 162 is connected to the humidifying unit 233. The humidifying unit 233 is a vaporizing humidifying unit. Therefore, humidified air is supplied into the housing portion 162. The humidified air prevents the electrostatic cling of the fragments M6 to the propeller 161 or the inner wall of the housing portion 162.

The mixing unit 17 is provided downstream of the fragmenting unit 16. The mixing unit 17 is a section that performs a mixing process of mixing the fragments M6 with an additive. The mixing unit 17 includes an additive supplying portion 171, a pipe 172, and a blower 173.

The pipe 172 is a flow passage which connects the housing portion 162 of the fragmenting unit 16 and a housing 182 of the dispersing unit 18 and through which a mixture M7 of the fragments M6 and the additive flows.

The additive supplying portion 171 is connected to a portion located between the ends of the pipe 172. The additive supplying portion 171 includes a housing portion 170 that contains an additive and a screw feeder 174 provided inside the housing portion 170. By rotation of the screw feeder 174, the additive contained inside the housing portion 170 is forced out of the housing portion 170 and is then supplied into the pipe 172. The additive supplied into the pipe 172 is mixed with the fragments M6 to turn into the mixture M7.

Examples of the additive supplied from the additive supplying portion 171 are a binder for bonding fibers to one another, a colorant for coloring fibers, an aggregation inhibitor for inhibiting aggregation of fibers, a flame retardant for making fibers and the like difficult to burn, a paper strengthening agent for enhancing the strength of recycled paper S, and a defibrated material. Any one of these kinds of the additive, or a combination of two or more, may be used. In the description below, as an example, a case where the additive is a binder P1 will be explained. Since the additive contains a binder for bonding fibers to one another, it is possible to enhance the strength of recycled paper S.

Examples of the binder P1 are naturally-derived matters such as starch, dextrin, glycogen, amylose, hyaluronic acid, arrowroot, konjac, dogtooth violet starch, etherified starch, esterified starch, natural gum glue, fiber induction glue, seaweed, animal protein, etc., or polyvinyl alcohol, polyacyric acid, polyacrylamide, or the like. Any one selected from among those enumerated here, or a combination of two or more, can be used. A preferred example is a naturally-derived matter. A more preferred example is starch. Moreover, for example, various kinds of thermoplastic resin such as polyolefin, acrylic resin, polyvinyl chloride, polyester, polyamide, various kinds of thermoplastic elastomer, or the like can also be used.

The blower 173 is provided downstream of the additive supplying portion 171 on a portion located between the ends of the pipe 172. The action of the rotating portion such as blades of the blower 173 facilitates the mixing of the fragments M6 and the binder P1. The blower 173 is able to generate airflow toward the dispersing unit 18. The airflow stirs the fragments M6 and the binder P1 inside the pipe 172. Therefore, the mixture M7 is sent to the dispersing unit 18 in a state in which the fragments M6 and the binder P1 are uniformly dispersed. The fragments M6 in the mixture M7 are disentangled in the process of flowing through the pipe 172, thereby turning into a finer fibrous form.

The blower 173 is electrically coupled to a controller 28 for control of its operation. In addition, it is possible to adjust an amount of air sent into a drum 181 by adjusting an amount of air blown by the blower 173.

Though not illustrated, the drum-side 181 end portion of the pipe 172 is bifurcated, and these two bifurcated ends are connected to non-illustrated inlets formed in end faces of the drum 181 respectively.

The dispersing unit 18 illustrated in FIG. 1 is a section that performs a disentangling process of disentangling fibers intertwined with one another in the mixture M7. The dispersing unit 18 includes the drum 181 that takes in and lets out the mixture M7 that is a defibrated material and the housing 182 that houses the drum 181.

The drum 181 is a sieve that has a cylindrical net structure and rotates around its central axis. When the drum 181 rotates, fibers, etc. that are smaller than the mesh of the net, among those contained in the mixture M7, are able to pass through the drum 181. In this process, the mixture M7 becomes disentangled and is then discharged together with air. That is, the drum 181 functions as a discharging portion that discharges a material that contains fibers.

The drum 181 is connected to a non-illustrated driver and rotates due to rotational power outputted from the driver. The driver is electrically coupled to the controller 28 for control of its operation.

The housing 182 is connected to the humidifying unit 234. The humidifying unit 234 is a vaporizing humidifying unit. Therefore, humidified air is supplied into the housing 182. It is possible to humidify the inside of the housing 182 by means of this humidified air, thereby preventing the electrostatic cling of the mixture M7 to the inner wall of the housing 182.

The mixture M7 having been discharged from the drum 181 falls while being dispersed in air and travels toward the second web forming unit 19, which is located under the drum 181. The second web forming unit 19 is a section that performs a second web forming process of forming a second web M8, which is obtained by accumulation of the mixture M7. The second web forming unit 19 includes a mesh belt 191, stretching rollers 192, and a suction unit 193.

The mesh belt 191 is a mesh member. In the illustrated structure, it is an endless belt. The mixture M7 having been dispersed by and discharged from the dispersing unit 18 accumulates on the mesh belt 191. The mesh belt 191 is stretched around the four stretching rollers 192. The mixture M7 on the mesh belt 191 is transported downstream by the rotation of the stretching rollers 192.

Though the mesh belt 191 is used as an example of the mesh member in the illustrated structure, the scope of the present disclosure is not limited thereto; for example, it may have a shape like a flat plate.

The size of most of the mixture M7 on the mesh belt 191 is larger than the mesh of the mesh belt 191. Therefore, most of the mixture M7 is unable to pass through the mesh belt 191 and is thus able to accumulate on the mesh belt 191. The mixture M7 is transported downstream together with the mesh belt 191 while accumulating on the mesh belt 191. Therefore, the second web M8 that has a layer shape is formed.

The suction unit 193 is a suction mechanism that sucks air from below the mesh belt 191. Therefore, it is possible to suck the mixture M7 onto the mesh belt 191, thereby facilitating the accumulation of the mixture M7 on the mesh belt 191.

A pipe 246 is connected to the suction unit 193. A blower 263 is provided on a portion located between the ends of the pipe 246. By the operation of the blower 263, a suction force can be generated in the suction unit 193.

The humidifying unit 236 is provided downstream of the dispersing unit 18. The humidifying unit 236 is an ultrasonic humidifying unit, similarly to the humidifying unit 235. Ultrasonic misting supplies moisture to the second web M8, thereby adjusting the moisture content of the second web M8. The moisture adjustment prevents the electrostatic cling of the second web M8 to the mesh belt 191. Therefore, the second web M8 comes off easily from the mesh belt 191 at a position where the mesh belt 191 is turned back by the stretching roller 192. The humidifying unit 235, 236 may be a vaporizing humidifying unit.

The total amount of moisture added to the humidifying units 231 to 236 may be, for example, preferably, 0.5 parts by mass or more and 20 parts by mass or less with respect to 100 parts by mass of the material before humidification.

The shape forming unit 20 is provided downstream of the second web forming unit 19. The shape forming unit 20 is a section that performs a sheet forming process of forming recycled paper S from the second web M8. The shape forming unit 20 includes a pressing portion 201 and a heating portion 202.

The pressing portion 201 includes a pair of calendar rollers 203 and is able to press the second web M8 between the calendar rollers 203 without heating. This increases the density of the second web M8. When heat is applied, a preferred degree of heating is, for example, a degree that does not cause the melting of the binder P1. The second web M8 with increased density is transported to the heating portion 202. One of the pair of calendar rollers 203 is a drive roller that is driven by the operation of a motor that is not illustrated, and the other is a driven roller.

The heating portion 202 includes a pair of heating rollers 204. It is possible to apply pressure while heating the second web M8 between the heating rollers 204. The heating and pressing causes the melting of the binder P1 in the second web M8. The molten binder P1 bonds the fibers together. By this means, the recycled paper S is formed. The recycled paper S is transported to the cutting unit 21. One of the pair of heating rollers 204 is a drive roller that is driven by the operation of a motor that is not illustrated, and the other is a driven roller.

The cutting unit 21 is provided downstream of the shape forming unit 20. The cutting unit 21 is a section that performs a cutting process of cutting the recycled paper S. The cutting unit 21 includes a first cutter 211 and a second cutter 212.

The first cutter 211 cuts the recycled paper S in a direction that intersects with the transportation direction of the recycled paper S, in particular, a direction that is orthogonal thereto.

The second cutter 212 cuts the recycled paper S in a direction parallel to the transportation direction of the recycled paper S downstream of the first cutter 211. The purpose of this cutting is to remove unnecessary both edge portions of the recycled paper S in the width direction to adjust the width of the recycled paper S.

The recycled paper S having a desired shape and a desired size can be obtained by cutting with the first cutter 211 and the second cutter 212 described above. The recycled paper S is further transported downstream to the stock unit 22 and is stored thereon.

Each unit included in the fibrous body processing apparatus 100 described above is electrically coupled to the controller 28, which is illustrated in FIG. 4. The operations of these units are controlled by the controller 28.

As illustrated in FIG. 4, the controller 28 includes a control unit 281, a storage unit 282, and a communication unit 283.

The control unit 281 includes at least one processor and runs various programs stored in the storage unit 282. For example, a CPU (Central Processing Unit) can be used as the processor. The control unit 281 has various functions such as functions of controlling components related to sheet production among the components of the fibrous body processing apparatus 100, including but not limited to a function of controlling the driving of the blower 261.

For example, programs regarding sheet production, etc. are stored in the storage unit 282. The communication unit 283 is configured as, for example, an I/O interface, and performs communication with the components of the fibrous body processing apparatus 100. The communication unit 283 has a function of communicating with, for example, a non-illustrated computer or a non-illustrated server via a network.

The controller 28 may be built in the fibrous body processing apparatus 100, or may be provided in an external device such as an external computer. The control unit 281 and the storage unit 282 may be, for example, integrated into a single unit. The control unit 281 may be built in the fibrous body processing apparatus 100, and the storage unit 282 may be provided in an external device such as an external computer. The storage unit 282 may be built in the fibrous body processing apparatus 100, and the control unit 281 may be provided in an external device such as an external computer.

Next, the coarsely-crushed-pieces supplying unit 10 will now be explained.

As illustrated in FIG. 2, the coarsely-crushed-pieces supplying unit 10 includes the coarsely-crushed-pieces reservoir portion 11, the coarsely-crushed-pieces sending portion 247, the weight measurement portion 12, and the fixed amount supplying portion 13.

The coarsely-crushed-pieces reservoir portion 11 is a portion that stores the coarsely crushed pieces M2, a raw material, and performs processing for humidifying the coarsely crushed pieces M2 by means of the humidified air WA supplied from the humidifying unit 231.

The coarsely-crushed-pieces reservoir portion 11 includes a reservoir tank 111 that has a coarsely-crushed-pieces feed port 112, a coarsely-crushed-pieces exit port 110A, and a humidified air exit port 110B. A cover member 113 for opening and closing the coarsely-crushed-pieces feed port 112 by being rotated is provided on the coarsely-crushed-pieces feed port 112. With the cover member 113 opened, the coarsely crushed pieces M2 are fed into the reservoir tank 111 through the coarsely-crushed-pieces feed port 112. The cover member 113 is closed when humidification processing on the coarsely crushed pieces M2 in the reservoir tank 111 is performed. The cover member 113 may be omitted with connection of a non-illustrated coarsely-crushed-pieces supplying pipe to the coarsely-crushed-pieces feed port 112, and the coarsely crushed pieces M2 may be fed into the reservoir tank 111 through this coarsely-crushed-pieces supplying pipe.

The coarsely crushed pieces M2 having been subjected to the humidification processing inside the reservoir tank 111 are let out of the reservoir tank 111 through the coarsely-crushed-pieces exit port 110A. An opening-and-closing unit such as, for example, a shutter for switching the coarsely-crushed-pieces exit port 110A between an open state and a closed state is provided on the coarsely-crushed-pieces exit port 110A, though not illustrated. For example, the operation of the opening-and-closing unit is controlled by the controller 28, and the open/closed status of the coarsely-crushed-pieces exit port 110A is switched in accordance with the operation of the opening-and-closing unit. This makes it possible to let out a desired amount of the coarsely crushed pieces M2 from the reservoir tank 111 at a desired timing.

The humidifying unit 231 is a vaporizing humidifier and sends the humidified air WA into the coarsely-crushed-pieces reservoir portion 11 so as to humidify the coarsely crushed pieces M2 contained therein. That is, the humidifying unit 231 generates the humidified air WA and supplies the humidified air WA to the coarsely-crushed-pieces reservoir portion 11. The humidifying unit 231 includes a container 31, a filter 32, and a fan 33.

The container 31 has an air inlet 311, an air outlet 312, and a liquid feed inlet 313. The air inlet 311 is an opening through which air is taken into the container 31 by operating the fan 33 and a fan 314. The air outlet 312 is an opening through which the humidified air WA is let out of the container 31 by operating the fans 33 and 314.

The humidified air sending portion 237 is a sending pipe that has an upstream-side end portion 238 and a downstream-side end portion 239. The upstream-side end portion 238 is connected to the air outlet 312. The downstream-side end portion 239 is connected to the reservoir tank 111 of the coarsely-crushed-pieces reservoir portion 11. The humidified air sending portion 237 includes the fan 314 provided on a portion located between the ends of the sending pipe.

The fan 314 generates airflow going from the upstream side toward the downstream side inside the sending pipe of the humidified air sending portion 237. That is, airflow directed toward the coarsely-crushed-pieces reservoir portion 11 is generated. The fan 314 includes rotary blades and a motor that drives and rotates the rotary blades. As illustrated in FIG. 4, the motor of the fan 43 is electrically coupled to the controller 28 for control of its operation. Due to the operation of the fan 314, the humidified air WA is sent from the upstream side toward the downstream side inside the humidified air sending portion 237.

The liquid feed inlet 313 is a port for taking a humidifying liquid, for example, water, into the container 31. A non-illustrated cover member, a non-illustrated shutter, or the like is provided on the liquid feed inlet 313 to make it openable and closable.

The filter 32 is disposed inside the container 31, configured to be able to suck up water contained in the container 31 to become impregnated therewith, and made of, for example, a woven fabric, a non-woven fabric, or a porous member such as a sponge. The fan 33 includes rotary blades and a motor that drives and rotates the rotary blades. As illustrated in FIG. 4, the motor of the fan 33 is electrically coupled to the controller 28 for control of its operation. By operating the fan 33, it is possible to generate the humidified air WA having increased humidity by causing air to pass through the filter 32 that contains moisture and performing vaporization, and to let it out through the air outlet 312.

The humidified air WA having been generated at the humidifying unit 231 in this way is supplied through the humidified air sending portion 237 to the reservoir tank 111 of the coarsely-crushed-pieces reservoir portion 11. By this means, it is possible to humidify the coarsely crushed pieces M2 contained in the coarsely-crushed-pieces reservoir portion 11 moderately. The humidification makes the coarsely crushed pieces M2 less susceptible to the effect of an electrostatic force. Therefore, advantageously, the entanglement of the coarsely crushed pieces M2 with one another and the electrostatic cling thereof to the inner wall of the coarsely-crushed-pieces reservoir portion 11 and the like are suppressed.

An amount of moisture added to the coarsely crushed pieces M2 through the humidification by the humidifying unit 231 may be, for example, preferably, 0.01 parts by mass or more and 5.0 parts by mass or less with respect to 100 parts by mass of the coarsely crushed pieces M2 before humidification. This makes it possible to humidify the coarsely crushed pieces M2 without excess or deficiency, thereby producing the above-described electrostatic-cling prevention effect effectively.

The coarsely crushed pieces M2 having been humidified at the coarsely-crushed-pieces reservoir portion 11 are sent through the coarsely-crushed-pieces sending portion 247, which is an example of a first transportation portion for connection between the coarsely-crushed-pieces reservoir portion 11 and the weight measurement portion 12, to the weight measurement portion 12.

The coarsely-crushed-pieces sending portion 247 includes a transportation passage 249. A feeder 248 capable of sending the coarsely crushed pieces M2 from the upstream side toward the downstream side is provided inside the transportation passage 249. At least a part of the transportation passage 249 is made of a pipe-like member. Specific examples of the feeder 248 include a screw feeder having a structure similar to that of the screw feeder 174 described above, a vibration feeder equipped with a vibration exciter, and a belt transportation mechanism. Any two or more of them may be combined.

However, the structure of the coarsely-crushed-pieces sending portion 247 is not limited to this example. It may have an air-carry structure, a free fall structure, or the like. Alternatively, this structure may be combined with the feeder 248.

When the coarsely crushed pieces M2 are let out of the reservoir tank 111 through the coarsely-crushed-pieces exit port 110A, they go out together with the humidified air WA contained in the reservoir tank 111. Therefore, the coarsely crushed pieces M2 and the humidified air WA are sent downstream through the coarsely-crushed-pieces sending portion 247.

The weight measurement portion 12 is provided downstream of the coarsely-crushed-pieces reservoir portion 11 via the coarsely-crushed-pieces sending portion 247.

As illustrated in FIG. 3, the weight measurement portion 12 includes an open-topped cylindrical container 121, which is a catcher for receiving the coarsely crushed pieces M2, and a load cell 122, which is provided on the bottom of the container 121 and serves as a weight measuring unit. The container 121 temporarily contains the coarsely crushed pieces M2 coming from the upstream-side end portion of the coarsely-crushed-pieces sending portion 247. The container 121 is not limited to the above-mentioned open-topped cylinder-like container. It may have a box-like shape. In this case, the shape of its bottom portion in a plan view is not specifically limited and may have any shape such as a circular shape, an elliptical shape, a polygonal shape, or the like.

The load cell 122 has a function of detecting an external force and converting the result of detection into an electric signal and outputting it. Moreover, the load cell 122 is provided in such a way as to support the container 121 from below. Therefore, it is possible to detect the weight of the coarsely crushed pieces M2 contained in the container 121.

Moreover, the load cell 122 is electrically coupled to the controller 28 illustrated in FIG. 4, a detection signal outputted from the load cell 122 is transmitted to the controller 28, and a detection result about the weight of the coarsely crushed pieces M2 can be obtained. The scheme of the load cell 122 is not specifically limited. It may be a magnetostrictive-type load cell, a capacitance-type load cell, a gyro-type load cell, a strain-gauge-type load cell, or the like.

The fixed amount supplying portion 13 is provided downstream of the weight measurement portion 12. The fixed amount supplying portion 13 has a shutter 131 for opening and closing an opening 120 provided in the bottom of the container 121. The shutter 131 has a non-illustrated driver such as, for example, a solenoid. This driver is electrically coupled to the controller 28 for control of its operation. That is, the opening and closing of the shutter 131 is controlled by the controller 28.

When the shutter 131 is in a closed state, the coarsely crushed pieces M2 having been sent from the coarsely-crushed-pieces sending portion 247 accumulate gradually in the container 121. When the weight of the coarsely crushed pieces M2 detected by the load cell 122 reaches a predetermined value, the shutter 131 becomes open, and a predetermined amount of the coarsely crushed pieces M2 goes out via the opening 120 and falls to be supplied to the defibrating unit 29 through the pipe 241 provided downstream thereof. Then, the shutter 131 is put back into a closed position again, thereby causing gradual accumulation of the coarsely crushed pieces M2 in the container 121. By repeating these operations, it is possible to supply a fixed amount of the coarsely crushed pieces M2 to the defibrating unit 29.

The structure of the fixed amount supplying portion 13 is not limited to the above example. It may include a rotation driver that causes the container 121 to rotate. In this case, when the weight of the coarsely crushed pieces M2 detected by the load cell 122 reaches a predetermined value, the container 121 is turned upside down. By this means, it is possible to let the coarsely crushed pieces M2 having accumulated in the container 121 fall to be supplied to the defibrating unit 29.

As illustrated in FIG. 2, the second transportation portion is configured as the pipe 241, the upstream-side end portion of the pipe 241 is connected to the fixed amount supplying portion 13, and the downstream-side end portion of the pipe 241 is connected to the coarsely-crushed-pieces inlet 291 of the defibrating unit 29.

Next, a flow of the humidified air WA generated at the humidifying unit 231 will now be described.

The humidified air WA generated at the humidifying unit 231 is supplied into the coarsely-crushed-pieces reservoir portion 11 via the humidified air sending portion 237. The humidified air WA contained in the coarsely-crushed-pieces reservoir portion 11, together with the coarsely crushed pieces M2, is supplied to the defibrating unit 29 via the coarsely-crushed-pieces exit port 110A, the coarsely-crushed-pieces sending portion 247, and the pipe 241. That is, the humidifying unit 231 has both a function of humidifying the coarsely-crushed-pieces reservoir portion 11 and a function of humidifying the defibrating unit 29 and supplies the humidified air WA to the coarsely-crushed-pieces reservoir portion 11 and the defibrating unit 29 sequentially. When this structure is adopted, as illustrated in FIG. 3, the humidified air WA flows by way of the weight measurement portion 12 and the fixed amount supplying portion 13. If an amount of the humidified air WA that flows by way of these portions is excessively large, there is a risk that the accuracy of weight measurement by the weight measurement portion 12 might decrease due to the wind pressure thereof. Consequently, the fixed-amount property of supply of the coarsely crushed pieces M2 at the fixed amount supplying portion 13 might be impaired. In view of this, in the present disclosure, the following structure is adopted, thereby making it possible to solve this problem.

As illustrated in FIG. 2, the fibrous body processing apparatus 100 includes a humidified air supplying passage 4 through which the humidified air WA generated at the humidifying unit 231 is supplied to the defibrating unit 29 while bypassing the weight measurement portion 12 and the fixed amount supplying portion 13. The humidified air supplying passage 4 is an air-sending pipe 40 that has an upstream-side end portion 41 and a downstream-side end portion 42. The upstream-side end portion 41 of the humidified air supplying passage 4 is connected directly or indirectly to the humidified air exit port 110B of the reservoir tank 111. The downstream-side end portion 42 of the humidified air supplying passage 4 is connected directly or indirectly to a portion of the pipe 241, and this portion is located downstream of the weight measurement portion 12 and the fixed amount supplying portion 13.

The humidified air WA contained in the coarsely-crushed-pieces reservoir portion 11 is split into humidified air WA1, which flows together with the coarsely crushed pieces M2 through the coarsely-crushed-pieces sending portion 247 toward the defibrating unit 29, and humidified air WA2, which flows through the humidified air supplying passage 4 toward the defibrating unit 29. The humidified air WA1 passes through the weight measurement portion 12 and the fixed amount supplying portion 13, whereas the humidified air WA2 is supplied to the defibrating unit 29 while bypassing the weight measurement portion 12 and the fixed amount supplying portion 13. In the present embodiment, the humidified air WA1 and the humidified air WA2 merge with each other at, of the pipe 241, the portion located downstream of the weight measurement portion 12 and the fixed amount supplying portion 13, and the merged humidified air WA1+WA2 is supplied to the defibrating unit 29, together with the coarsely crushed pieces M2 flowing down through the pipe 241.

With the structure described above, even when a total amount of the humidified air WA let out of the reservoir tank 111 (WA1+WA2) is the same as that of related art, it is possible to reduce a flow amount and a flow velocity of the humidified air WA1 passing through the coarsely-crushed-pieces sending portion 247 together with the coarsely crushed pieces M2 because there exists the humidified air WA2 flowing while bypassing the weight measurement portion 12. Therefore, it is possible to prevent the flow amount and the flow velocity of the humidified air WA1 passing through the weight measurement portion 12 from being excessive. Therefore, it is possible to mitigate adverse effects of the wind pressure of the humidified air WA1 on measurement of the weight of the coarsely crushed pieces M2 by the weight measurement portion 12, for example, a decrease in weight measurement precision and weight measurement reproducibility due to significant variation in the wind pressure of the humidified air WA1. Therefore, it is possible to guarantee accuracy in measurement of the weight of the coarsely crushed pieces M2 by the weight measurement portion 12, improve the fixed-amount property of supply of the coarsely crushed pieces M2, and, consequently, enhance the quality of recycled paper S.

As described above, the upstream-side end portion 41 of the humidified air supplying passage 4 is connected directly or indirectly to the coarsely-crushed-pieces reservoir portion 11, and the downstream-side end portion 42 of the humidified air supplying passage 4 is connected directly or indirectly to the pipe 241, which is an example of the second transportation portion. This structure makes it possible to install the humidified air supplying passage 4 on an existing model with a simpler upgrading work, as compared with a structure in which the downstream-side end portion 42 is directly connected to the defibrating unit 29.

In the present embodiment, the downstream-side end portion 42 of the humidified air supplying passage 4 is connected directly or indirectly to a portion of the pipe 241. However, the scope of the present disclosure is not limited to this example. The downstream-side end portion 42 of the humidified air supplying passage 4 may be connected directly or indirectly to the coarsely-crushed-pieces inlet 291 of the defibrating unit 29, the housing of the defibrating unit 29, or the like. The upstream-side end portion 41 of the humidified air supplying passage 4 may be connected directly or indirectly to the humidified air sending portion 237 or the humidifying unit 231.

Let R1 be a flow amount of the humidified air WA1. Let R2 be a flow amount of the humidified air WA2. When these definitions are given, R1/R2, though not specifically limited, may preferably satisfy a relation of $0.05 \leq R1/R2 \leq 3$ or less, or more preferably, $0.1 \leq R1/R2 \leq 1$ or less. Satisfying this relation makes it possible to more reliably mitigate adverse effects of the wind pressure of the humidified air WA1 on the weight measurement performed by the weight measurement portion 12.

The less the value of R1/R2, the better because reducing this value decreases the effects on the weight measurement portion 12 and improves the measurement precision. However, if this value is reduced excessively, the electrostatic-charge prevention function of the humidified air might deteriorate.

The humidified air supplying passage 4 includes a fan 43, which is an example of a first blowing unit, in its portion "en route" in the length direction, that is, between the upstream-side end portion 41 and the downstream-side end portion 42. The fan 43 generates airflow going from the upstream side toward the downstream side inside the air-sending pipe 40 of the humidified air supplying passage 4. That is, airflow directed toward the coarsely-crushed-pieces inlet 291 of the defibrating unit 29 is generated. The fan 43 includes rotary blades and a motor that drives and rotates the rotary blades. As illustrated in FIG. 4, the motor of the fan 43 is electrically coupled to the controller 28 for control of its operation. Operating the fan 43 described above makes it possible to facilitate the sending of the humidified air WA2 through the humidified air supplying passage 4 and make the flow amount thereof stable, thereby producing the above-described effects more reliably and stably. Moreover, it is possible to adjust the flow amount of the humidified air WA2 described above by adjusting the output of the fan 43, that is, its air-sending capability. Consequently, it is possible to adjust the value of R1/R2 described above more appropriately, that is, within the range described above.

The fan 43 may be configured to be always driven, or driven only when the humidifying unit 231 and the fan 314 of the humidified air sending portion 237 are operating, or driven at the timing when the coarsely crushed pieces M2 are let out through the coarsely-crushed-pieces exit port 110A.

As described above, the humidified air supplying passage 4 includes the fan 43, which is an example of the first blowing unit and generates airflow directed toward the defibrating unit 29, between the upstream-side end portion 41 and the downstream-side end portion 42. With this structure, it is possible to more remarkably produce the above-described effects of facilitating the sending of the humidified air WA2 through the humidified air supplying passage 4, making the flow amount thereof stable, and guaranteeing accuracy in measurement of the weight of the coarsely crushed pieces M2 by the weight measurement portion 12.

As described above, the fibrous body processing apparatus 100 includes the coarsely-crushed-pieces reservoir portion 11 that stores the coarsely crushed pieces M2 made of a material that contains fibers; the humidifying unit 231 that generates the humidified air WA and supplies the humidified air WA to the coarsely-crushed-pieces reservoir portion 11; the weight measurement portion 12 that measures the weight of the coarsely crushed pieces M2 let out of the coarsely-crushed-pieces reservoir portion 11; the fixed amount supplying portion 13 that supplies a fixed amount of the coarsely crushed pieces M2 measured by the weight measurement portion 12; the defibrating unit 29 that defibrates the coarsely crushed pieces M2 supplied from the fixed amount supplying portion 13; the coarsely-crushed-pieces sending portion 247 that is an example of a first transportation portion through which the coarsely crushed pieces M2 are sent from the coarsely-crushed-pieces reservoir portion 11 to the weight measurement portion 12; the pipe 241 that is an example of a second transportation portion through which the coarsely crushed pieces M2 are sent from the fixed amount supplying portion 13 to the defibrating unit 29; and the humidified air supplying passage 4 which includes the upstream-side end portion 41 and the downstream-side end portion 42 and through which the humidified air WA generated at the humidifying unit 231 is supplied to the defibrating unit 29 while bypassing the weight measurement portion 12. This structure makes it possible to mitigate adverse effects of the wind pressure of the humidified air WA1 on the weight measurement of the coarsely crushed pieces M2 performed by the weight measurement portion 12. Therefore, it is possible to guarantee accuracy in measurement of the weight of the coarsely crushed pieces M2 by the weight measurement portion 12 and improve the fixed-amount property of supply of the coarsely crushed pieces M2.

The fibrous body processing apparatus 100 may include, upstream of the coarsely-crushed-pieces supplying unit 10, a raw material supplying unit that supplies a sheet-shaped raw material, and a coarse crusher such as a so-called shredder that coarsely crushes the sheet-shaped raw material. In this case, coarsely crushed pieces M2 are generated at the coarse crusher, and the coarsely crushed pieces M2 are fed into the reservoir tank 111 of the coarsely-crushed-pieces reservoir portion 11.

Second Embodiment

Figure 5:
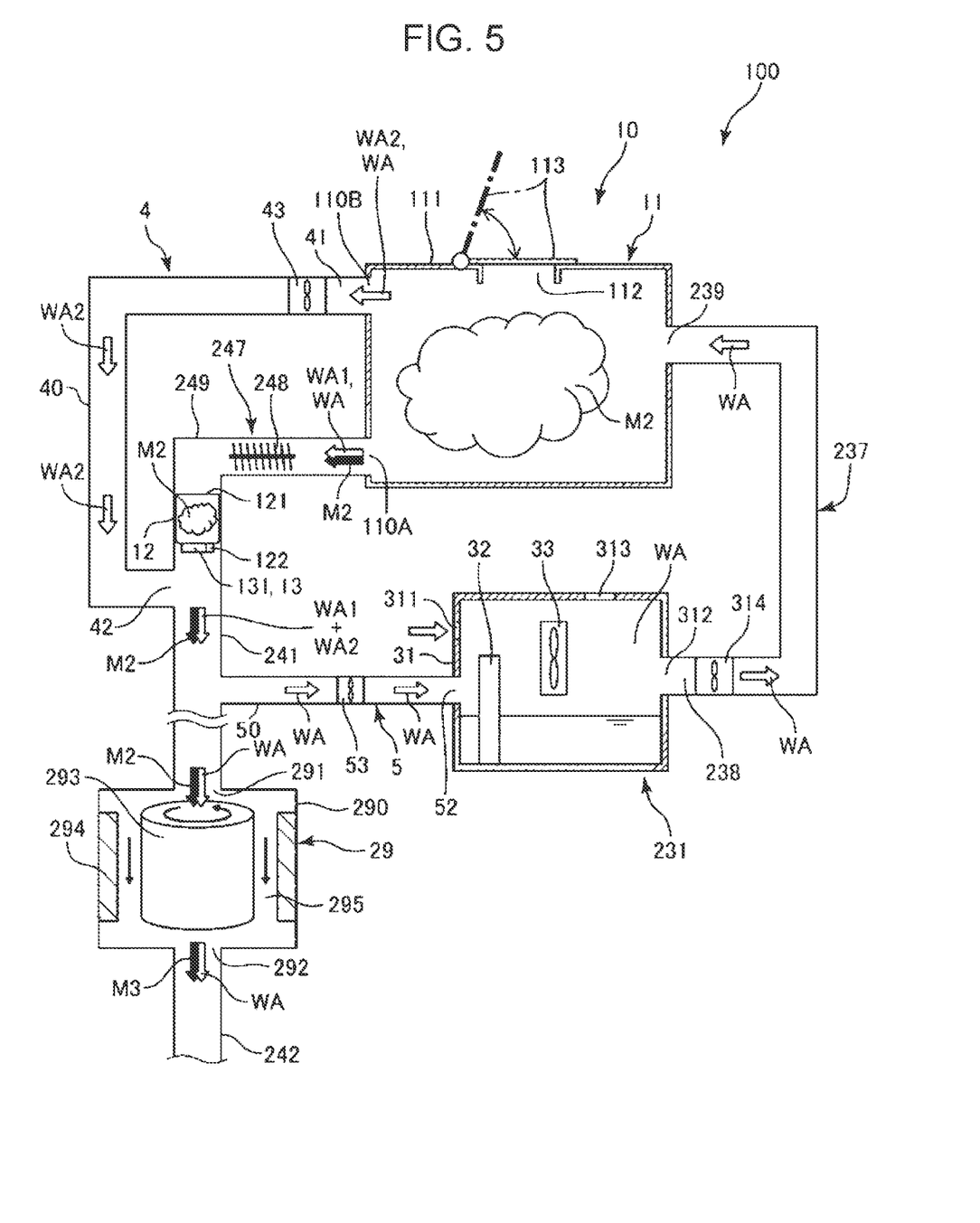
FIG. 5 is a diagram that schematically illustrates the structure of a fibrous body processing apparatus according to a second embodiment, and more particularly, the structure of a coarsely-crushed-pieces supplying unit and the neighborhood thereof.

FIG. 5 is a diagram that schematically illustrates the structure of a fibrous body processing apparatus according to a second embodiment, and more particularly, the structure of a coarsely-crushed-pieces supplying unit and the neighborhood thereof.

With reference to FIG. 5, a fibrous body processing apparatus according to a second embodiment of the present disclosure will now be described. The description below will be focused on the point of difference from the foregoing first embodiment, and the same description will not be repeated.

As illustrated in FIG. 5, the fibrous body processing apparatus 100 includes a returning passage 5 through which the humidified air WA that is present inside the humidified air supplying passage 4 or the pipe 241 that is an example of the second transportation portion is returned to the humidifying unit 231. In the present embodiment, the returning passage 5 is an air-sending pipe 50 that has an upstream-side end portion 51 and a downstream-side end portion 52. The upstream-side end portion 51 of the returning passage 5 is connected to a portion located between the ends of the pipe 241, and the downstream-side end portion 52 is connected to the container 31 of the humidifying unit 231.

Even while the production of the recycled paper S by the fibrous body processing apparatus 100 is paused, there are cases where it is desired to humidify the coarsely crushed pieces M2 contained in the coarsely-crushed-pieces reservoir portion 11. Suppose that, in such a case, the operation of the defibrating unit 29 is stopped, and the humidifying unit 231 is operating. Stopping the operation of the defibrating unit 29 makes it difficult to supply the humidified air WA to the defibrating unit 29. However, since the returning passage 5 is provided, a circulation passage for the humidified air WA, by way of which the humidified air WA generated at the humidifying unit 231 flows through the humidified air sending portion 237, the coarsely-crushed-pieces reservoir portion 11, the humidified air supplying passage 4 or the coarsely-crushed-pieces sending portion 247, the pipe 241, and the returning passage 5 sequentially to return to the humidifying unit 231, is formed. Since the circulation passage for the humidified air WA is formed as described above, even when the operation of the defibrating unit 29 is stopped, it is possible to supply the humidified air WA to the coarsely-crushed-pieces reservoir portion 11 and to keep the coarsely crushed pieces M2 contained in the coarsely-crushed-pieces reservoir portion 11 in a humidified state. Consequently, when the fibrous body processing apparatus 100 that has been paused is restarted, it is possible to supply the coarsely crushed pieces M2 that are humidified enough to the defibrating unit 29, even immediately after the restart. Therefore, it is possible to enhance the quality of the recycled paper S that is produced.

As described above, the fibrous body processing apparatus 100 includes the returning passage 5 through which the humidified air WA that is present inside the humidified air supplying passage 4 or the pipe 241 that is an example of the second transportation portion is returned to the humidifying unit 231. With this structure, it is possible to supply the humidified air WA to the coarsely-crushed-pieces reservoir portion 11 even while the operation of the defibrating unit 29 is paused, not to mention while the defibrating unit 29 is operating.

The returning passage 5 includes a fan 53, which is an example of a second blowing unit, in its portion "en route" in the length direction, that is, between the upstream-side end portion 51 and the downstream-side end portion 52. The fan 53 generates airflow going from the upstream side toward the downstream side inside the air-sending pipe 50 of the returning passage 5. That is, airflow directed toward the humidifying unit 231 is generated. The fan 53 includes rotary blades and a motor. Though not illustrated, the motor of the fan 53 is electrically coupled to the controller 28 for control of its operation. Operating the fan 53 described above makes it possible to facilitate the sending of the humidified air WA through the returning passage 5 and make the flow amount thereof stable, thereby producing the above-described effects more reliably and stably.

It is preferable if the fan 53 is configured to be driven when the humidifying unit 231 is operated in order to supply the humidified air WA to the coarsely-crushed-pieces reservoir portion 11 in a state in which the operation of the defibrating unit 29 is paused.

As described above, the returning passage 5 includes the fan 53, which is an example of the second blowing unit and generates airflow directed toward the humidifying unit 231. With this structure, it is possible to facilitate the sending of the humidified air WA through the returning passage 5, that is, the returning thereof toward the humidifying unit 231, and thus produce the above-described effects more reliably.

Third Embodiment

Figure 6:
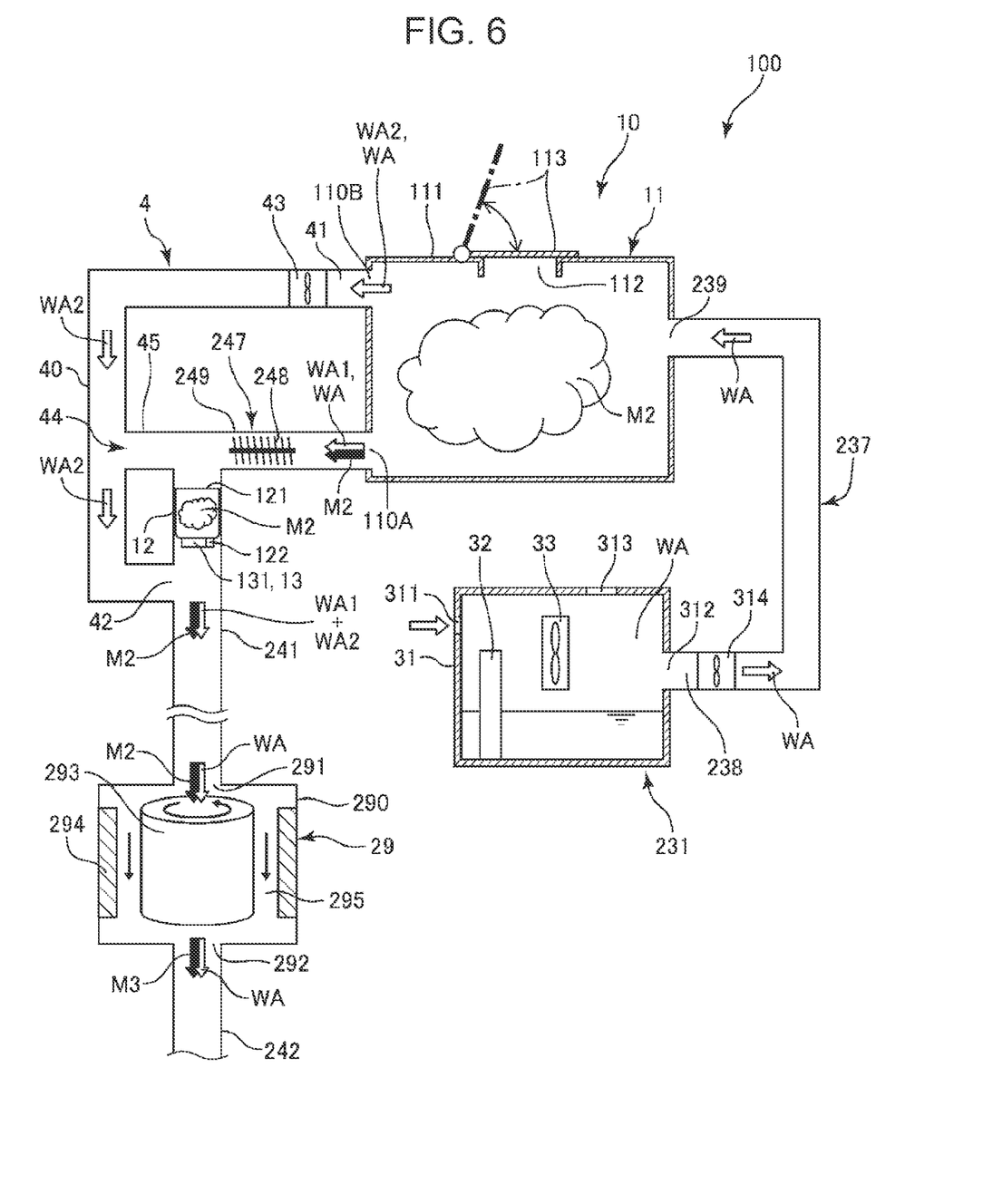
FIG. 6 is a diagram that schematically illustrates the structure of a fibrous body processing apparatus according to a third embodiment, and more particularly, the structure of a coarsely-crushed-pieces supplying unit and the neighborhood thereof.

FIG. 6 is a diagram that schematically illustrates the structure of a fibrous body processing apparatus according to a third embodiment, and more particularly, the structure of a coarsely-crushed-pieces supplying unit and the neighborhood thereof.

With reference to FIG. 6, a fibrous body processing apparatus according to a third embodiment of the present disclosure will now be described. The description below will be focused on the point of difference from the foregoing first embodiment, and the same description will not be repeated.

As illustrated in FIG. 6, the fibrous body processing apparatus 100 includes a communication portion 44 via which the coarsely-crushed-pieces sending portion 247, as an example of the first transportation portion, and the humidified air supplying passage 4 are in communication with each other. In the illustrated structure, the communication portion 44 is a communication pipe 45 that is continuous between the coarsely-crushed-pieces sending portion 247 and the humidified air supplying passage 4.

If the pipe wall of the coarsely-crushed-pieces sending portion 247 and the pipe wall of the humidified air supplying passage 4 are arranged in contact with each other, the communication portion 44 may be a through hole formed in the contact portion of the pipe walls.

It is preferable if an average cross-sectional area size H2 of the flow passage of the communication portion 44 is smaller than an average cross-sectional area size H1 of the flow passage of the humidified air supplying passage 4. That is, it is preferable if a relation of $0.1 \leq H2/H1 \leq 0.95$, or more preferably, $0.2 \leq H2/H1 \leq 0.7$, is satisfied. If the cross-sectional area size H2 is excessively large, the amount of the humidified air WA2 flowing inside the humidified air supplying passage 4 to bypass the weight measurement portion 12 will be small, and, as a result, the aforementioned value of R1/R2 tends to increase and, therefore, depending on other conditions, there is a possibility that the benefit of providing the humidified air supplying passage 4 might not be achieved sufficiently.

Each of the flow amount R1 of the humidified air WA1 flowing through the coarsely-crushed-pieces sending portion 247 and the flow amount R2 of the humidified air WA2 flowing through the humidified air supplying passage 4 changes over time and, therefore, R1/R2 also changes over time. However, since the coarsely-crushed-pieces sending portion 247 and the humidified air supplying passage 4 are in communication with each other via the communication portion 44, even if the flow amount R1 and the flow amount R2 change, rebalancing is possible. That is, it is possible to stabilize the value of R1/R2. Consequently, it is possible to more reliably mitigate adverse effects of the wind pressure of the humidified air WA1 on the weight measurement of the coarsely crushed pieces M2 performed by the weight measurement portion 12.

Though not illustrated, the communication portion 44 may include an on-off valve capable of opening and closing the flow passage of the communication pipe 45 at a desired timing and a desired degree of opening. This structure makes it possible to adjust an amount of air passing through the communication portion 44 in accordance with the flow amount R1 of the humidified air WA1 and the flow amount R2 of the humidified air WA2.

As described above, the fibrous body processing apparatus 100 includes the communication portion 44 via which the coarsely-crushed-pieces sending portion 247, as an example of the first transportation portion, and the humidified air supplying passage 4 are in communication with each other. This structure makes it possible to more reliably mitigate adverse effects of the wind pressure of the humidified air WA1 on the weight measurement of the coarsely crushed pieces M2 performed by the weight measurement portion 12, and thus produce the above-described effects more remarkably.

In the fibrous body processing apparatus 100 according to the third embodiment, the returning passage 5 according to the second embodiment may be provided. This structure makes it possible to combine the above effect obtained by providing the communication portion 44 with the above effect obtained by providing the returning passage 5.

Although a fibrous body processing apparatus according to the illustrated embodiments has been described above, the scope of the present disclosure is not limited to the foregoing examples. The components constituting the fibrous body processing apparatus may be replaced with any alternatives that fulfill the same functions. Any additional component may be included in the fibrous body processing apparatus. The fibrous body processing apparatus may have a combination of the features of the foregoing embodiments.

What is claimed is:

1. A fibrous body processing apparatus, comprising:
   a coarsely-crushed-pieces reservoir unit that stores coarsely crushed pieces made of a material that contains fibers;
   a humidifying unit that generates humidified air and supplies the humidified air to the coarsely-crushed-pieces reservoir unit;
   a weight measurement unit that measures a weight of the coarsely crushed pieces let out of the coarsely-crushed-pieces reservoir unit;
   a fixed amount supplying unit that supplies a fixed amount of the coarsely crushed pieces measured by the weight measurement unit;
   a defibrating unit that defibrates the coarsely crushed pieces supplied from the fixed amount supplying unit;
   a first transportation portion through which the coarsely crushed pieces are sent from the coarsely-crushed-pieces reservoir unit to the weight measurement unit;
   a second transportation portion through which the coarsely crushed pieces are sent from the fixed amount supplying unit to the defibrating unit; and
   a humidified air supplying passage which includes an upstream-side end portion and a downstream-side end portion and through which humidified air generated at the humidifying unit is supplied to the defibrating unit while bypassing the weight measurement unit.

2. The fibrous body processing apparatus according to claim 1, wherein
   the humidified air supplying passage includes, between the upstream-side end portion and the downstream-side end portion, a first blowing unit that generates airflow directed toward the defibrating unit.

3. The fibrous body processing apparatus according to claim 1, wherein
   the upstream-side end portion of the humidified air supplying passage is connected directly or indirectly to the coarsely-crushed-pieces reservoir unit, and
   the downstream-side end portion of the humidified air supplying passage is connected directly or indirectly to the second transportation portion.

4. The fibrous body processing apparatus according to claim 1, further comprising:
   a returning passage through which humidified air that is present inside the humidified air supplying passage or the second transportation portion is returned to the humidifying unit.

5. The fibrous body processing apparatus according to claim 4, wherein
   the returning passage includes a second blowing unit that generates airflow directed toward the humidifying unit.

6. The fibrous body processing apparatus according to claim 1, further comprising:
   a communication portion via which the first transportation portion and the humidified air supplying passage are in communication with each other.

* * * * *